Dec. 21, 1926.

R. C. FISCHER 1,611,827

CAMERA SHUTTER LOCK

Filed Jan. 18, 1923

INVENTOR
RAYMOND C. FISCHER

BY
ATTORNEY

Patented Dec. 21, 1926.

1,611,827

UNITED STATES PATENT OFFICE.

RAYMOND C. FISCHER, OF OAKLAND, CALIFORNIA.

CAMERA-SHUTTER LOCK.

Application filed January 18, 1923. Serial No. 613,369.

My invention is a lock for the shutter lever of a camera. Unless particular care is taken, the average amateur will occasionally expose the same section of film twice, thus ruining the picture. To obviate this possibility, I have provided a lock, which holds the shutter lever, against any movement, after one exposure has been taken. The lock is effective until a new section of film is rotated into position.

An object of my invention is to provide a lock which will automatically hold the shutter lever from operating after each exposure.

A further object of my invention is to provide a lock which is simple in construction and efficient in operation.

In this application, I have shown my lock applied to a box camera of the type usually sold on the market, but it is understood that the invention may be applied to other types of cameras.

The drawings illustrate the prefered form of my invention, but it may be embodied in other forms, and in this specification and appended claims, I wish to cover my invention in whatever form it may be embodied.

Figure 1:
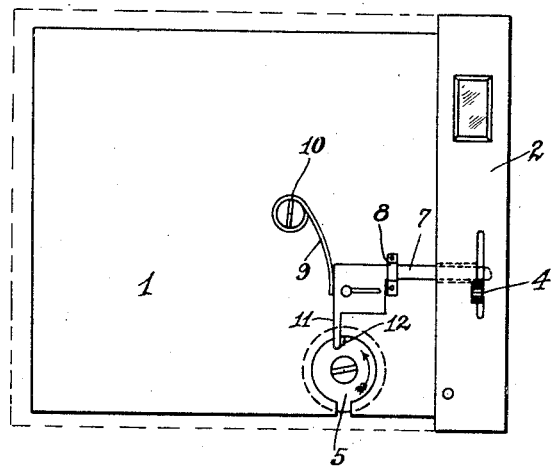
Figure 1 is a side view of the forward film holding part of a camera with my lock attached thereto.
Figure 2:
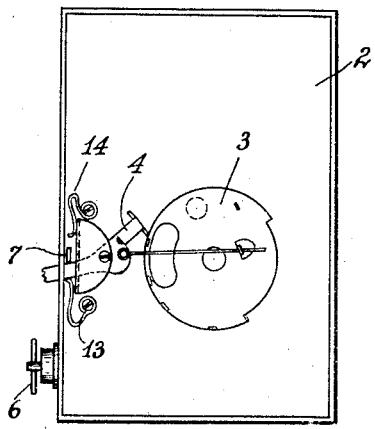
Figure 2 is a front view of the same with the cover removed.
Figure 3:
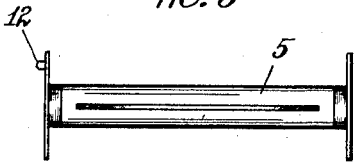
Figure 3 is a side view of the film reel.

Referring more particularly to the drawing, the numeral 1 indicates the film holding frame, and the numeral 2 the shutter head, each of a well known construction. A shutter 3 is mounted in the head 2, and is adapted to be operated by a lever 4, pivoted adjacent said shutter. The film take up reel 5 (of standard construction) is journaled adjacent the lower edge of the frame 1. The usual handle 6 engages the reel 5, whereby said reel is rotated, to bring a new film section into position to be exposed.

Slidably mounted on the wall of the frame 1 above the reel 5 is a stop pin 7. The pin 7 extends through a strap 8, and into the head 2 in the path of the shutter lever 4. The shutter lever 4 swings both upwardly and downwardly and operates the shutter 3 on each motion. The pin 7 extends into the path of the lever 4, midway between its upper and lower position, to engage said lever in either position. A spring 9 is secured at 10 to the frame 1 and presses against the rear of the pin 7 to urge it forwardly into the path of the lever 4. The releasing finger 11 projects downwardly from the pin 7 over the end of the reel 5. A lug 12 projects outwardly from the end of the reel 5, and is adapted to engage the finger 11, when the reel is rotated in the direction of the arrow of Fig. 1. The reel in its rotation carries the finger 11 and pin 7 rearwardly to withdraw said pin from the path of the lever 4, and consequently allows said lever to swing and operate the shutter. A spring 13 is mounted on the head 2 adjacent the lower position of the lever 4, and a spring 14 is secured to the head adjacent the upper position of the lever 4. The lever 4 compresses the springs 13 or 14 in the operation of the shutter 3. When the lever has moved past the pin 7, to operate the shutter in its swing, the pin projects into its path and holds it in either the upper or lower position, and with the spring 13 or 14 compressed. The take up reel 5 must now be operated bringing a new section of film into position. This causes the lug 12 to engage the finger 11 and retract the pin 7, which allows the spring 13 or 14 to swing the lever 4 slightly in front of the pin 7 and prevent said pin from projecting into the path of said lever. The camera is now in position to take another picture, i. e., the lever 4 may swing to operate the shutter, whereupon the pin 7 is again released into its path.

Having described my invention, I claim:

1. The combination with a camera, having a shutter, a shutter lever, and a take up reel, a pin adapted to project into the path of travel of said shutter lever, and means on said take up reel to retract said pin, a spring adjacent said shutter lever, adapted to move said lever over said pin when the pin is retracted.

2. The combination with a camera, a reel within said camera, a lug on said reel, a shutter, a lever adapted to operate said shutter, a locking means for said lever, said locking means being provided with a finger adapted to extend within the path of movement of said lug so that as said reel is rotated said locking means is retracted from the path of movement of said lever and means whereby said lever is then urged into the path of movement of said locking means.

3. In a device of the class described, an oscillatory shutter lever, a reciprocatively mounted pin adapted to move forwardly into the path of said lever, a finger depending from said pin, a spring engaging said pin to urge it forwardly, a film-winding reel adjacent said finger, a lug on said reel adapted to engage said pin to move it rearwardly and a second spring adapted to urge the shutter lever into the path of said pin.

4. In a device of the class described, a shutter lever, a reciprocatively mounted pin adapted to move forwardly into the path of said lever, means actuated by the winding of said reel for moving said pin out of the path of said lever, and a spring mounted on each side of said lever for moving said lever into the path of said pin.

In testimony whereof I affix my signature.

RAYMOND C. FISCHER.